Patented Sept. 16, 1952

2,610,974

UNITED STATES PATENT OFFICE 2,610,974

CHEMICAL MANUFACTURE

John Walter Nelson, Hammond, Ind., assignor to Sinclair Refining Company, New York, N. Y., a corporation of Maine No Drawing. Application April 20, 1950, Serial No. 157,177

4 Claims. (Cl. 260—413)

My invention relates to synthetic fatty acids of unusually high molecular weight which are particularly useful as grease components.

The new acids of my invention are of an unusually high molecular weight, containing more than 18 carbon atoms per molecule and usually in excess of 24 carbon atoms per molecule and ranging up to forty and more. They are essentially monocarboxylic, have saponification numbers of about 200 and less and are characterized by extreme insolubility in water. The acids have low ionization constants (high Ks. p.). They have a unique capacity to form an interlacing structure with oils and solvents and will gell readily. The acids are insoluble in cold alcohol, although will dissolve in hot acetone or benzene. They have a relatively low melting point. In appearance, the acids are white to amber in color, and are hard and smooth to the touch.

I have found that these synthetic fatty acids can be prepared by oxidizing microcrystalline waxes having 34 to 55 carbon atoms per molecule in the presence of a stoichiometric excess of oxygen and about 0.1 to 4.0% by weight of an oxidation catalyst at a temperature in excess of about 100° C. for a period of time sufficient to effect substantially complete conversion of the wax to acids. The fatty acids having more than 18 carbon atoms per molecule are then separated from the reacted mixture, as by distillation. For example, a microcrystalline wax derived from a Texas crude and containing 34 to 55 carbon atoms per molecule is oxidized with air in the presence of potassium permanganate. The reaction is carried out at about 110° C. to 130° C. with 150 to 225 liters of air per kilogram of wax per hour using about 1.0 to 2.0% by weight of potassium permanganate. The reaction is continued until conversion is essentially complete, for instance, until the reaction mixture has a saponification number of at least about 100 and, usually, 200 to about 500. The high molecular weight acids, higher than C18, are then separated from the reaction mixture which contains certain small amounts of organic and inorganic materials. This may be accomplished by washing the mixture with water and/or an inorganic acid for the removal of inorganic materials such as catalyst, and then subjecting the mixture to distillation in a flash still under reduced pressure for elimination of any lower acids and other organic substances.

I am well aware of the fact that certain waxes of petroleum origin have been, in the past, oxidized to products including organic acids. However, I believe that I am the first to find that highly useful monocarboxylic fatty acids, having more than 18 carbon atoms, could be prepared in high yield from microcrystalline waxes having 34 to 55 carbon atoms per molecule by complete conversion under conditions of controlled oxidation. Although my invention is not based on any particular theory, I think that the substantially complete degree of conversion in my process of preparing these acids derives in large measure from the slight branching of the carbon chain making up the C34 to C55 microcrystalline wax molecules I oxidize. This susceptibility to complete conversion appears to be unique with such waxes since other wax oxidation processes in the art are generally restricted to only partial conversion. Foreign and domestic investigators appear to have carried out wax conversions to certain limited degrees. These investigators have found that reaction past an optimum point will break down the acids formed into lower molecular weight acids while the partially reacted products tend to polymerize or resinify when reacted past a certain stage. As a result, these processes have been carefully restricted to limit undesirable side reactions as those resulting in the formation of keto acids and chain degradation in order to obtain practical yields of useful products. I believe that the reason that the acids of my invention have lower saponification numbers than naturally-occurring acids and have extremely high molecular weights lies largely in their preparation from microcrystalline wax. The acids are essentially monocarboxylic. It is also possible that they may contain lactonic groups, hydroxy groups and other groups such as

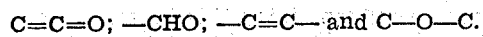

In the preparation of the high molecular weight fatty acids according to my invention, microcrystalline waxes containing about 34 to 55 carbon atoms per molecule are oxidized. The C34 to C55 microcrystalline waxes are derived from higher boiling petroleum distillates and residues such as lubricating oil fractions. The waxes are largely composed of molecules especially characterized, according to my studies, by slight branchings in the carbon chain. This structure may be contrasted to crystalline wax molecules which are essentially straight chain. Generally, the branching in the microcrystalline wax molecule is at random along the chain, each branch appearing to contain an average of about three carbon atoms. The microcrystalline wax to be oxidized may be composed of molecules containing very similar or identical numbers of carbon atoms. Generally, however, the wax will be made up of mixtures of molecules over the range of 34 to 55 carbon atoms as well as having molecules of varying structure. The waxes may be oxidized in the pure or impure state, although elimination of contaminating substances prior to reaction tends toward better product quality. For instance, a $C_{34}$ to $C_{55}$ microcrystalline wax obtained from a Texas crude may be purified for reaction by contact at elevated temperatures with aluminum chloride for a short period of time in the usual procedure well known in the art.

The reaction is carried out in the presence of 0.1 to 4.0 per cent by weight on the wax of an oxidation catalyst. Satisfactory catalysts include those dispersible in microcrystalline wax such as manganese salts, ammonium vanadate and potassium permanganate. I have found that potassium permanganate, present in amount of about 0.1 to 1.25 per cent by weight on the wax, is particularly advantageous as respects a shorter reaction period and improved product quality. In any event, less than about 0.1% of the catalyst results in inordinately prolonged oxidation periods while amounts greater than about 4% tend to oxidation products heterogeneous, inconsistent and stringy in appearance and poor in color. Oxidation catalyst promoters or sensitizers may be employed to accelerate the reaction rate even more. For example, sodium carbonate, manganese palmitate or other manganese salts, may be added in small amounts as accelerators, for instance, in amounts generally equal to or less than the quantity of the oxidation catalyst employed. The oxidation catalyst is advantageously added to the microcrystalline wax prior to commencement of the oxidation. In addition, I have found it advantageous to add the catalyst to the wax in aqueous solution and to remove the solvent water by evaporation. For instance, potassium permanganate may be added as a 15–20% by weight solution. The water is removed prior to reaction by applying heat, say by heating the mixture to 145–150° C., or air or oxygen may be added and the solvent water removed in the course of the reaction. Additional catalyst may be added later, that is, during the reaction, to step up the oxidation rate.

I have also found that by adding to the reaction mixture as a "seed" acid composition derived from a prior run, reaction time may be reduced as much as 50% and is usually at least 10 to 20% less, without any sacrifice in product quality or in reaction yield, over the use of the catalyst alone under similar conditions of reaction. For example, a microcrystalline wax derived from a Texas crude and containing 34 to 55 carbon atoms per molecule is oxidized in the presence of potassium permanganate and 0.1 to 1.25% by weight of seed having a saponification number of about 200 to 300. The reaction is carried out at about 110° C. with 150 to 225 liters of air per kilogram of wax per hour using 1.0 to 2.0% by weight of potassium permanganate. The reaction is continued until conversion is essentially complete, for instance, until the reaction mixture has a saponification number of at least 100, and usually, 200 to 400, and the higher acids are then separated out.

I add about 0.1 to 4.0% by weight on the wax of the acid composition prepared in a prior run. Although the seed may be added before or after commencement of the oxidation reaction or before or after the addition of catalyst, I have found that a highly favorable reaction rate consistent with good product quality and yield is obtained by first adding the seed to the wax, then adding the catalyst in aqueous solution and commencing oxidation. After the catalyst is added, the oxidizing gas may be added at reaction conditions. If the catalyst is added in aqueous solution, the solvent water may be removed by evaporation before reaction, as by heating to 145 to 150° C., if desired. Also, as is the case with the catalyst, additional seed may be added during the course of the reaction to step up the oxidation rate. In any event, particularly advantageous reaction rates are obtained when about 1.0 to 2.0% by weight of catalyst is employed and a similar amount of seed. I have found that the reaction will not go by adding the seed alone, that is, without at the same time employing the oxidation catalyst. The seed has a saponification number in the range of about 100 to 500, contains in substantial amount fatty acid molecules having upwards of eighteen carbon atoms, and has low solubility in water.

The fatty acids of my invention are formed by oxidation of the reaction mixture in the presence of oxygen, either in pure form or in admixture with inert diluents, say as air. The oxygen is added in at least the stoichiometric amount for a period of time sufficient to effect complete conversion. Advantageously, the oxygen is used in considerable excess of the stoichiometric quantity which reduces reaction time yet results in a very favorable product. I prefer to add oxygen, considered as substantially pure oxygen, in amounts in the range approximating 30 to 50 liters per kilogram of wax per hour. I have found that an amount of about 35 to 45 liters per hour of oxygen per kilogram of wax is particularly advantageous. In any event, amounts less than about 30 liters per hour of oxygen per kilogram of wax tend to unattractively long reaction periods while excessive quantities, i. e., over 50 liters per hour, are not necessary and are wasteful. The use of pure oxygen or diluted oxygen such as air does not noticeably affect product quality, although a higher oxygen concentration does improve reaction time. Good dispersion of the oxygen into the mixture undergoing reaction is necessary for minimum reaction periods. For instance, oxygen contact and dispersion may be improved by introducing the oxygen into the reaction mass and by constant agitation of this mass during reaction.

Considerable latitude is afforded in oxidation temperature, although the thermal environment should be in excess of about 100° C. for the period of the reaction. Temperatures in the range approximating 100 to 150° C. are preferred. I have found that oxidation temperatures between about 110 to 130° C. afford particularly favorable results, with a minimum of side product and carbon oxide formation and with maximum oxygen absorption. The reaction vessel may be cooled when necessary to maintain the desired temperature range since the reaction after commencement is exothermic in nature.

The reacted mixture is oxidized until the $C_{34}$ to $C_{55}$ microcrystalline wax has been completely converted into essentially fatty acids. During the course of the reaction, water and volatile acidic matter is given off in small quantities. Generally, the degree of conversion is determined by the saponification number and the length of time required for complete conversion depends in large measure upon the quantity of oxygen available to the wax undergoing reaction and the accompanying thermal environment. However, the catalyst and seed employed, their proportions and even the exact nature of the wax appear to figure in the reaction rate also. Usually, the microcrystalline wax is oxidized until the reaction mixture has a saponification number of at least 100, and advantageously to saponification numbers of 200 to 300 or more. Saponification numbers of the solid reaction product as high as 300 to 400 are not uncommon and indicate a high degree of or complete conversion as well as a greater degree of cleavage. However, the prolonged period of oxidation is generally at least 30 to 40 hours and reaction time as long as 200 to 300 hours are encountered.

After substantially complete conversion has been effected, the reaction mass essentially comprises a mixture of fatty acids containing a substantial portion of the monocarboxylic fatty acids according to my invention having more than 18 carbon atoms per molecule. The mixture also contains certain small quantities of other organic and inorganic matter such as unreacted wax, lower molecular weight acids and catalyst material. The $C_{18}$ plus acids may be obtained in pure form by washing the solid mixture free of inorganic materials with water and/or an inorganic acid, such as hydrochloric acid, and then distilling the mixture to separate out the higher acids. For example, the acid mixture is first washed by adding water and hydrochloric acid. The resulting mass is stirred and permitted to settle. The acid-water layer which separates out is removed. The product may be washed again as with water alone, the water removed after another settling period and the product blown with air to evaporate any remaining water. The washed product is then distilled to remove the substantially pure $C_{18}$ plus fatty acids. This may be accomplished by flash distillation in the presence of steam or under high vacuum, or by moleclar distillation, in the usual manner. For instance, employing flash distillation, the charge stock is preheated and distilled at elevated temperatures under low pressure, advantageously as low as practicable, e. g., 1.5 to 3 millimeters of mercury. By distilling at temperatures in the range of 150–300° C. the lower acids in the reaction mixture are taken off first. By then flash distilling over about 300° C., and in regulated increasing increments of distillation temperature, successively higher molecular weight fractions over $C_{18}$ are taken off as desired. For instance, the higher molecular weight acids according to my invention may be separated into a number of fractions, such as into a lower fraction containing $C_{19}$ to $C_{23}$ fatty acids, having saponification numbers in the range of about 195 to 155; an intermediate fraction containing $C_{24}$ to $C_{34}$ acids, having saponification numbers in the range of 154 to 110 and a high fraction containing $C_{35}$ and higher acids, having a saponification number of about 109 and lower.

The fatty acids according to my invention have considerable utility due to their unique properties. In particular, they may be compounded into highly satisfactory grease compositions. The products are especially valuable as grease components because of their water incompatibility, capacity to form an interlacing structure with oils and solvents readily susceptible to gellation and because of their lubricating and corrosion inhibiting capacities. The relative value of a given acid mixture in a grease, or for that matter in other applications, appears to depend primarily upon the carboxyl group in the molecular structure. However, other groups contained in the molecule, such as the hydroxy group, have additional secondary importance in determining specifically valuable properties. In addition, the acids find application in tinning operations, as plasticizers and as waterproofing agents, due to their water insolubility and other properties valuable for these purposes.

The fatty acids of my invention may be converted to other useful compounds, such as to the corresponding salts by saponification or to the corresponding esters by esterification.

The corresponding salts can be prepared by reacting the acids with an alkali, such as potassium hydroxide. Generally, salts may be prepared of the metals of group I of the periodic table, group II metals and may include also other metal salts such as Al, Sn, Sb, Cr, Pb, Mn, Fe, Co and Ni. In addition, other forms such as the ammonium, amine, e. g., triethanolamine, morpholine, cyclohexylamine, or amide, e. g., as the amide obtained from the triethylene-diamine or the like, may be prepared. The esters, prepared by reaction of the acids with an alcohol, may include among others, the Me, Et and Pr esters, the glycerides, the glycols as well as esters having a basic group such as those prepared with ethanol amine.

The following examples are intended to more clearly illustrate the $C_{18}$ plus fatty acids of my invention.

*Example I*

12,123 grams of a microcrystalline wax derived from a Sweet West Texas crude were charged into a reactor flask. 1.0% by weight of potassium permanganate dissolved in 500 ml. of water was added to the wax. The mixture was heated to 150° C. to remove the solvent water. The mixture was then cooled to 110° C. and 1.0% by weight of a seed having a saponification number of 430 was added. The mixture was reacted at 110° C. in the presence of 37–44 liters per hour per kilogram of wax of pure oxygen. During the course of the reaction a water layer and an acid layer were taken off overhead. When the reaction mixture had a saponification number of 117, after about 20 hours of reaction, a portion was removed from the mixture undergoing reaction. This portion was cooled and then washed with water and hydrochloric acid. It was then charged into a Claissen still operated at 205° C. in order to remove any residual hydrochloric acid or water present. The washed acid product was then preheated and passed to a flash still operated at about 205° C. under 2 mm. of pressure. A lighter acid fraction containing essentially acids having less than 18 carbon atoms per molecule was taken off overhead. This fraction comprised 1.1% by weight on the charged material, had a saponification number of 264, an acid number of 206 and an iodine number of 16.7. The operating temperature of the flash still was then raised to 300° C. at a pressure of 1.3 mm. A heavier acid fraction containing essentially monobasic fatty acids having more than 18 carbon atoms per molecule was taken off. This fraction comprised 34.4% by weight on the original charged material, had a saponification number of about 112, an acid number of 73 and an iodine number of 19.2. The bottoms fraction remaining, containing a small quantity of impurities in admixture with extremely high molecular weight monobasic fatty acids comprised 64.5% by weight on the original charged material, had a saponification number of 104, an acid number of 36 and an iodine number of 24.6.

*Example II*

When the solid reaction product of Example I had a saponification number of 173, after about 30 hours of reaction, another small portion was taken off. This portion was cooled and then washed with water and hydrochloric acid. The washed product was then charged into a Claissen still operated at 205° C. under 10 mm. of pressure in order to remove any residual hydrochloric acid and water that might be present. The washed acid product was then preheated and passed to a flash still operated at about 205° C. under 2 mm. of pressure. A light acid fraction containing essentially acids having less than 18 carbon atoms per molecule was taken off overhead. This fraction comprised 5.9% by weight on the charged material, had a saponification number of 273, an acid number of 206 and an iodine number of 17.6. The operating temperature of the flash still was then raised to 300° C. under a pressure of 1.6 mm. A heavier acid fraction containing essentially monobasic fatty acids having more than 18 carbon atoms per molecule was taken off overhead. This fraction comprised 31.0% by weight on the original charged material, had a saponification number of about 174, an acid number of 109 and an iodine number of 20.3. The bottoms fraction remaining, containing a small quantity of impurities in admixture with extremely high molecular weight fatty acids, comprised 63.2% by weight on the original charged material, had a saponification number of 148, an acid number of 59 and an iodine number of 30.1.

*Example III*

12,371 grams of a microcrystalline wax derived from a Sweet West Texas crude were charged into a reactor flask. 1.1% by weight of potassium permanganate dissolved in 600 ml. water was added to the wax. The mixture was heated to 150° C. to remove the solvent water. The mixture was then cooled to 110° C. and 1.1% by weight of a seed having a saponification number of 337 was added. The mixture was reacted at 110° C. in the presence of 37–44 liters per hour per kilogram of wax of pure oxygen. During the course of the reaction a water layer and an acid layer were taken off overhead. When the reaction mixture had a saponification number of 152, after about 27 hours of reaction, a portion was removed from the mixture undergoing reaction. This portion was cooled and then washed with water and hydrochloric acid. It was then charged into a Claissen still operated at 205° C. in order to remove any residual hydrochloric acid or water present. The washed acid product was then preheated and passed to a flash still operating at about 205° C. at 2 mm. of pressure. A lighter acid fraction containing essentially acids having less than 18 carbon atoms per molecule was taken off overhead. This fraction comprised 3.6% by weight on the charged material, had a saponification number of 286, an acid number of 223 and an iodine number of 13.9. The operating temperature of the flash still was then raised to 300° C. under a pressure of 1.6 mm. A heavier acid fraction containing essentially monobasic fatty acids having more than 18 carbon atoms per molecule was taken off overhead. This fraction comprised 34.5% by weight on the original charged material, had a saponification number of about 150 and an acid number of 103. The bottoms fraction remaining, containing a small quantity of impurities in admixture with extremely high molecular weight monobasic fatty acids comprised 61.9% by weight on the original charged material, had a saponification number of 130, an acid number of 56 and an iodine number of 22.9.

*Example IV*

When the solid reaction product of Example III had a saponification number of 215, after 50 hours of reaction, another small portion was taken off. This portion was cooled and then washed with water and hydrochloric acid. The washed product was then charged into a Claissen still operated at 205° C. under about 10 mm. of pressure in order to remove any residual hydrochloric acid and water that might be present. The washed acid product was then preheated and passed to a flash still operated at about 205° C. under 2 mm. of pressure. A lighter acid fraction containing essentially acids having less than 18 carbon atoms per molecule was taken off overhead. This fraction comprised 8.8% by weight on the charged material, had a saponification number of 283, an acid number of 219 and an iodine number of 12.4. The operating temperature of the flash still was then raised to 300° C. under a pressure of 2.7 mm. A heavier acid fraction containing essentially monobasic fatty acids having more than 18 carbon atoms per molecule was taken off overhead. This fraction comprised 34.8% by weight on the original charged material, had a saponification number of about 193, an acid number of 130 and an iodine number of 18.3. The bottoms fraction remaining, containing a small quantity of impurities in admixture with extremely high molecular weight fatty acids comprised 56.3% by weight on the original charged material, had a saponification number of 176, an acid number of 71 and an iodine number of 25.8.

*Example V*

2530 kilograms of a microcrystalline wax derived from a Sweet West Texas crude and having 34 to 55 carbon atoms per molecule were charged into a standard Pfaudler kettle. The wax mass was heated to 94° C. whereupon 30.3 kilograms of potassium permanganate dissolved in 199 kilograms of water were added while the mixture was stirred. This amount of catalyst was equal to 1.2% by weight on the wax. The solvent water was removed by heating the wax mixture to about 149° C. The mixture was then slowly cooled and when the temperature reached 135° C., 25 kilograms of seed were added. This was equal to about 1.0% by weight on the wax. After the addition of seed the kettle was sealed and air was admitted through a valve in the bottom. Air was admitted under pressure of about 6 atmospheres at the rate of 454,000 liters per hour (corrected to 155° C. at 1 atm.) by means of a partially-opened valve. This was equivalent to 38 liters of pure oxygen per hour per kilogram of wax. The reaction was carried out at a temperature maintained at 110° C.±3° C. The reaction mixture had the following saponification numbers at the indicated stage of the reaction:

| Stage of Reaction, Hrs. | Saponification Number |
|---|---|
| 7 | 14 |
| 14 | 29 |
| 18 | 36 |
| 38 | 72 |
| 42 | 81 |
| 63 | 114 |
| 86 | 147 |
| 110 | 174 |
| 134 | 201 |
| 158 | 219 |
| 182 | 222 |

736 kilograms of the reaction product was withdrawn after 215 hours. It analyzed as follows:

Saponification No _____ 247
Acid No _____ 139
Iodine No _____ 2.8
P. M. P., °C _____ 64
Per cent Mn _____ 0.45

This composition was washed by adding 24 kilograms of muriatic acid (37% HCl) and 1420 liters of water. This was mixed with the reaction product for 4 hours and allowed to settle for 10 hours. The acid and water layer was dropped out and 1420 liters more of water added. Again the mixture was stirred for 4 hours and allowed to settle for 10 hours. After the water was removed, a stream of air was bubbled through the mass at 94° C. to remove the last traces of water. The washed composition analyzed as follows:

Saponification No _____ 208
Acid No _____ 112
Iodine No _____ 7.8
P. M. P., °C _____ 63
Per cent Mn _____ 0.0
Per cent $H_2O$ _____ 0.065

The mass was distilled in a vacuum flash still. At about 205° C. under 3 mm. of pressure, a cut containing essentially acids having less than 18 carbon atoms per molecule was taken off overhead. The distillation temperature was raised to about 300° C. under 2 mm. of pressure and a cut containing essentially $C_{19}$ to $C_{23}$ monobasic fatty acids was taken off overhead, having a saponification number of 175. The distillation temperature was then raised to 325° C. and a cut containing essentially $C_{24}$ to $C_{34}$ monobasic fatty acids was taken off overhead, having a saponification number of 135. The bottoms product remaining had a saponification number of about 100 and contained $C_{35}+$ monobasic fatty acids and heavier materials.

Example VI

To the reaction mass of Example V (from which a portion was withdrawn and tested) were added 9.1 kilograms of potassium permanganate dissolved in 46 kilograms of water. The water was removed as in Example V and oxidation was continued until the mass had a saponification number of 327, or after 313 hours of total reaction time. During this stage of the reaction the reaction mass had the following saponification numbers at the indicated stage of the reaction:

| Reaction Stage, hours | Saponification Number |
|---|---|
| 198 | 228 |
| 205 | 231 |
| 210 | 240 |
| 215 | 249 |
| 228 | 249 |
| 234 | 253 |
| 250 | 261 |
| 274 | 275 |

The crude composition analyzed as follows:

Saponification No. _____ 327
Acid No. _____ 179
Iodine No. _____ 3.4
P. M. P., °C _____ 59
Per cent mn _____ 0.91

The reaction mass was then washed by adding 79 kilograms of muriatic acid (37% HCl) and 4940 liters of water. This was mixed with the reaction product for 4 hours and allowed to settle for 10 hours. The acid and water layers were then dropped out and 4940 liters of fresh water were added. Again the mixture was stirred for 4 hours and allowed to settle for 10 hours. After the last layer was removed a stream of air was bubbled through at 93° C. to remove the last traces of water. The air blow was stopped when the water content was 0.06%. The washed product analyzed as follows:

Saponification No. _____ 267
Acid No. _____ 142
Iodine No. _____ 4.8
P. M. P., °C _____ 60
Percent Mn _____ 0.0
Percent $H_2O$ _____ 0.09

The mass was distilled in a vacuum flash still. At about 205° C. under 3 mm. of pressure, a cut containing essentially acids having less than 18 carbon atoms per molecule was taken off overhead. The distillation temperature was raised to about 300° C. under 2 mm. of pressure and a cut containing essentially $C_{19}$ to $C_{23}$ monobasic fatty acids was taken off overhead, having a saponification number of 175. The distillation temperature was then raised to 325° C. and a cut containing essentially $C_{24}$ to $C_{34}$ monobasic fatty acids was taken off overhead, having a saponification number of 135. The bottoms product remaining had a saponification number of about 100 and contained $C_{35}+$ monobasic fatty acids and heavier materials.

I claim:

1. As a new composition of matter, a mixture of high molecular weight wax acids produced by substantially complete oxidation of microcrystalline wax containing 34 to 55 carbon atoms per molecule which is characterized by extreme water insolubility and by a saponification number less than about 200 and which predominates in monocarboxylic acids having an apparent chain length exceeding eighteen carbon atoms per molecule.

2. As a new composition of matter, a mixture of high molecular weight wax acids produced by substantially complete oxidation of microcrystalline wax containing 34 to 55 carbon atoms per molecule which is characterized by extreme water insolubility and by a saponification number of about 175 and which predominates in monocarboxylic acids having an apparent chain length in the range of about 19 to 23 carbon atoms per molecule.

3. As a new composition of matter, a mixture of high molecular weight wax acids produced by substantially complete oxidation of microcrystalline wax containing 34 to 55 carbon atoms per molecule which is characterized by extreme water insolubility and by a saponification number of about 135 and which predominates in monocarboxylic acids having an apparent chain length in the range of about 24 to 34 carbon atoms per molecule.

4. As a new composition of matter, a mixture of high molecular weight wax acids produced by substantially complete oxidation of microcrystalline wax containing 34 to 55 carbon atoms per molecule which is characterized by extreme water insolubility and by a saponification number less than about 113 and which predominates in monocarboxylic acids having an apparent chain length exceeding 34 carbon atoms per molecule.

JOHN WALTER NELSON.

REFERENCES CITED

The following references are of record in the file of this patent:

UNITED STATES PATENTS

| Number | Name | Date |
|---|---|---|
| 2,288,769 | Alleman et al. | July 7, 1942 |

OTHER REFERENCES

Nelson: Petroleum Refinery Engineering, 3rd ed., pages 63–64.